United States Patent
Sharma et al.

(10) Patent No.: US 10,623,421 B2
(45) Date of Patent: Apr. 14, 2020

(54) DETECTING IP ADDRESS THEFT IN DATA CENTER NETWORKS

(71) Applicant: Cisco Technology, Inc., San Jose, CA (US)

(72) Inventors: Govind P. Sharma, Union City, CA (US); Gilles Rhéal Roy, Stittsville (CA); Eric Levy-Abegnoli, Valbonne (FR); Ajay Kumar Modi, San Jose, CA (US); Sridhar Vallepalli, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 230 days.

(21) Appl. No.: 15/788,861

(22) Filed: Oct. 20, 2017

(65) Prior Publication Data
US 2019/0124093 A1    Apr. 25, 2019

(51) Int. Cl.
| H04L 29/06 | (2006.01) |
| G06F 21/44 | (2013.01) |
| H04L 12/931 | (2013.01) |
| H04L 12/933 | (2013.01) |
| H04L 29/08 | (2006.01) |

(52) U.S. Cl.
CPC .......... *H04L 63/1416* (2013.01); *G06F 21/44* (2013.01); *H04L 49/70* (2013.01); *H04L 63/1483* (2013.01); *G06F 2221/2113* (2013.01); *H04L 49/1515* (2013.01); *H04L 67/1097* (2013.01)

(58) Field of Classification Search
CPC .................................................. H04L 63/1416
USPC ............................................................ 726/23
See application file for complete search history.

(56) References Cited

U.S. PATENT DOCUMENTS

| 8,107,396 | B1 |  | 1/2012 | Sharma |
| 8,893,271 | B1 | * | 11/2014 | Sharma ............... H04L 63/0236 726/22 |
| 10,004,097 | B1 | * | 6/2018 | Somasandharam ... H04W 76/11 |
| 2006/0285493 | A1 | * | 12/2006 | Manuja ............. H04L 29/06027 370/235 |
| 2007/0130427 | A1 | * | 6/2007 | Lahti ....................... H04L 49/90 711/133 |
| 2013/0107699 | A1 | * | 5/2013 | Miclea ................... H04L 45/68 370/228 |
| 2013/0139243 | A1 | * | 5/2013 | Poola .................. H04L 63/0326 726/11 |
| 2013/0291117 | A1 | * | 10/2013 | Thubert .............. H04L 63/1458 726/26 |
| 2014/0328343 | A1 | * | 11/2014 | Kapadia ................ H04L 45/741 370/392 |

(Continued)

*Primary Examiner* — Harris C Wang
(74) *Attorney, Agent, or Firm* — Merchant & Gould P.C.

(57) ABSTRACT

Theft detection in data center networks may be provided. First, a first leaf switch may create an entry in a first distributed secure cache in response to an endpoint appearing on the first leaf switch. The entry may correspond to the endpoint and may be marked as having a tentative state. Then a request message may be sent to a plurality of leaf switches. The request message may comprise data identifying the endpoint. Next, a reply message may be received in response to the request message from a second leaf switch within the plurality of leaf switches. The tentative state may then be removed from the entry in response to the reply message indicating that the endpoint is valid.

11 Claims, 3 Drawing Sheets

(56) References Cited

U.S. PATENT DOCUMENTS

| | | | |
|---|---|---|---|
| 2015/0085830 A1* | 3/2015 | Nozaki | H04W 40/00 370/332 |
| 2015/0163192 A1* | 6/2015 | Jain | H04L 61/103 370/255 |
| 2015/0172156 A1* | 6/2015 | Lohiya | H04L 61/103 709/224 |
| 2017/0127370 A1* | 5/2017 | Wang | H04W 4/80 |
| 2018/0124074 A1* | 5/2018 | Natarajan | H04L 63/1416 |
| 2019/0124093 A1* | 4/2019 | Sharma | H04L 63/1483 |

* cited by examiner

DETECTING IP ADDRESS THEFT IN DATA CENTER NETWORKS

TECHNICAL FIELD

The present disclosure relates generally to virtualized data center networks.

BACKGROUND

Cloud computing is a model that allows access to a shared pool of configurable computing resources. Cloud computing and storage solutions provide users and enterprises with various capabilities to store and process their data in third-party data centers. It shares resources to achieve coherence and economies of scale.

Cloud computing also focuses on maximizing the effectiveness of the shared resources. Cloud resources are usually not only shared by multiple users, but are also dynamically reallocated per demand. This can work for allocating resources to users. For example, a cloud computer facility that serves European users during European business hours with a specific application (e.g., e-mail) may reallocate the same resources to serve North American users during North American business hours with a different application (e.g., a web server). This approach helps maximize computing power use while reducing the overall resources cost by using, for example, less power, air conditioning, rack space, to maintain the system. With cloud computing, like other client-server architectures, multiple users can access a single server to retrieve and update their data without purchasing licenses for different applications.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
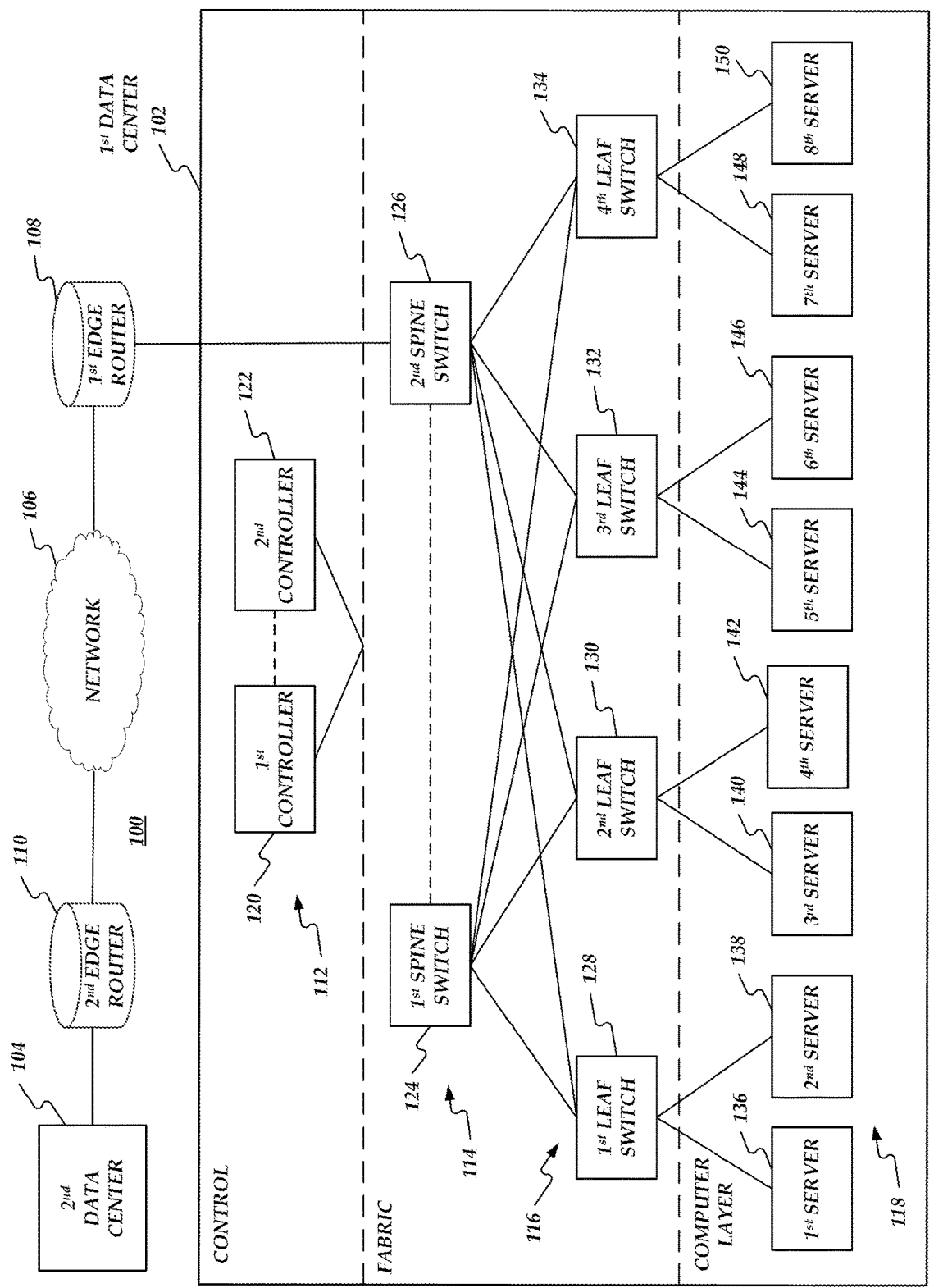
FIG. 1 is a block diagram of an operating environment for providing theft detection in data center networks.

Theft detection in data center networks may be provided. First, a first leaf switch may create an entry in a first distributed secure cache in response to an endpoint appearing on the first leaf switch. The entry may correspond to the endpoint and may be marked as having a tentative state. Then a request message may be sent to a plurality of leaf switches. The request message may comprise data identifying the endpoint. Next, a reply message may be received in response to the request message from a second leaf switch within the plurality of leaf switches. The tentative state may then be removed from the entry in response to the reply message indicating that the endpoint is valid.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

As datacenter networks evolve, many customer topologies may be moving towards CLOS based network designs. Benefits of CLOS based network designs may include, but not limited to, the availability of equal cost multipath based switching fabric, a simplified network, and a fully utilized link bandwidth on each network node. CLOS based network designs may also allow networks to scale and grow incrementally on demand.

Network switches in a CLOS based network design may be organized into two or more stages of switches. The lowest-level stage may include switches (i.e., leaf switches) that may provide network connectivity to hosts (e.g., endpoints or virtual machines) and may implement Layer 2 bridging and Layer 3 routing functions. The next higher level stage of switches (i.e., spine switches) may provide redundant paths and connectivity from a previous lower-level stage switch in the network.

A large virtualized data center fabric (i.e., network), for example, may comprise between 500 to 1,000 leaf switches and as many as 8 to 16 spine switches servicing many of its tenant's virtual networks on a shared physical network infrastructure. Each leaf switch in turn may be connected, for example, to 32 to 98 physical servers (e.g., ESX servers). Each server may be hosting approximately 20 virtual endpoints, which estimates to approximately 1,000 to 2,000 endpoints connected per leaf switch. In such a shared network deployment, network access security may become an important factor for customers.

In virtualized data center deployments, the movement of endpoints from one leaf port to another or from one endpoint group (e.g., tied to a dot1q VLAN of the vSwitch tags to outgoing packets) to another within the same leaf switch or across leaf switches of the network fabric may be common. In such loosely coupled network connectivity models where the location of the endpoints may not be fixed, the network fabric and the endpoints may become vulnerable to attacks by "rogue" devices. If the initial network access or the subsequent endpoint moves are allowed without any verification or validation, this may lead to security issues. This may enforce important requirements on the underlying first hop switches that are responsible for network connectivity, to grant only authorized endpoints to have network access and deny any unauthorized device (e.g., a prospective endpoint) to have connectivity.

Moreover, the traditional address assignment and neighbor address resolution protocols such as Address Resolution Protocol (ARP), IPv6 Neighbor Discovery (ND), and Dynamic Host Configuration Protocol (DHCP), used in the network, may be vulnerable to many first hop network security threats caused by address spoofing and hijacking roles of legitimate routers and DHCP servers. Examples of such threats may comprise, but are not limited to, poisoning of host neighbor caches, man-in-middle attacks, replay attacks, Denial of Service (DoS) attacks, and disruption of host communication. In contrast, embodiments of the disclosure may provide a network centric data plane based mechanism to detect and block such security threats by rogue devices, while allowing authorized endpoints to function normally.

FIG. 1 is a block diagram of an operating environment 100 for providing theft detection in data center networks. As shown in FIG. 1, operating environment 100 may comprise a first data center 102, a second data center 104, a network 106, a first edge router 108, and a second edge router 110. Network 106 may comprise, but is not limited to, a global system of interconnected computer networks that use the Internet protocol suite (TCP/IP) to link devices. Network 106 may comprise, for example, the Internet. First edge router 108 and second edge router 110 may connect first data center 102 and second data center 104 together through network 106.

First data center 102 and second data center 104 may be used by a number of tenants and may service many of its tenant's virtual networks on a shared physical network infrastructure provided by first data center 102 and second data center 104. In other words, the tenant's virtual networks may be serviced by first data center 102, second data center 104, or may be stretched across both first data center 102 and second data center 104.

First data center 102 may comprise a system including computer systems and associated components, such as telecommunications and storage systems. First data center 102 may include redundant or backup power supplies, redundant data communications connections, environmental controls and various security devices. As described above, first data center 102 may comprise a CLOS based network using a large virtualized datacenter fabric. First data center 102 will be described in greater detail below. Second data center 104 may be of similar design and function as compared to first data center 102.

First data center 102 may comprise a plurality of controllers 112, a plurality of spine switches 114, a plurality of leaf switches 116, and a plurality of servers 118. Plurality of controllers 112 may comprise a first controller 120 and a second controller 122. Plurality of spine switches 114 may comprise a first spine switch 124 and a second spine switch 126. Each of the plurality of spine switches 114 may comprise a network switch at Level 2 (L2) of the CLOS network design providing connectivity to Level 1 (L1) leaf switches. Plurality of leaf switches 116 may comprise a first leaf switch 128, a second leaf switch 130, a third leaf switch 132, and a fourth leaf switch 134. Each of plurality of leaf switches 116 may comprise a Top of the Rack (TOR) Ethernet Switch in the Level 1 (L1) of the CLOS network design that may provide connectivity and network switching functions to the network infrastructure. Plurality of servers 118 may comprise a first server 136, a second server 138, a third server 140, a fourth server 142, a fifth server 144, a sixth server 146, a seventh server 148, and an eight server 150.

As shown in FIG. 1, the network switches of first data center 102 may comprise a shared physical network infrastructure and may be organized into two or more stages. Plurality of leaf switches 116 may comprise lowest-level stage switches in first data center 102 and may provide network connectivity to hosts. For example, plurality of leaf switches 116 may implement Layer 2 bridging and Layer 3 routing functions. Plurality of spine switches 114 may comprise next higher level stage switches in first data center 102 and may provide redundant paths and connectivity from a previous lower-level stage switch in plurality of leaf switches 116.

As stated above, plurality of leaf switches 116 may provide network connectivity to hosts of various tenant virtual networks serviced by first data center 102 and second data center 104. Consistent with embodiments of the disclosure, the hosts may comprise, but are not limited to, virtual endpoints (e.g., software modules) operating on plurality of server 118. These endpoints may move around in the network between the servers in plurality of servers 118 or on to servers in second data center 104. In such loosely coupled network connectivity models where the location of the endpoints may not be fixed, the network fabric and the endpoints may become vulnerable to attacks by "rogue" devices (i.e., rogue endpoints). In other words, a malicious user may attempt to obtain access to the network using a rogue endpoint that attempts to appear to the network as a legitimate or valid endpoint.

In such a shared network deployment where various tenant virtual networks share a physical network infrastructure provided by first data center 102 and second network 104, network access security may become an important factor for first data center 102's and second network 104's tenants. Accordingly, embodiments of the disclosure may provide a network centric data plane based process to detect and block such security threats by rogue or invalid endpoints, while allowing authorized or valid endpoints to function normally.

Figure 2:
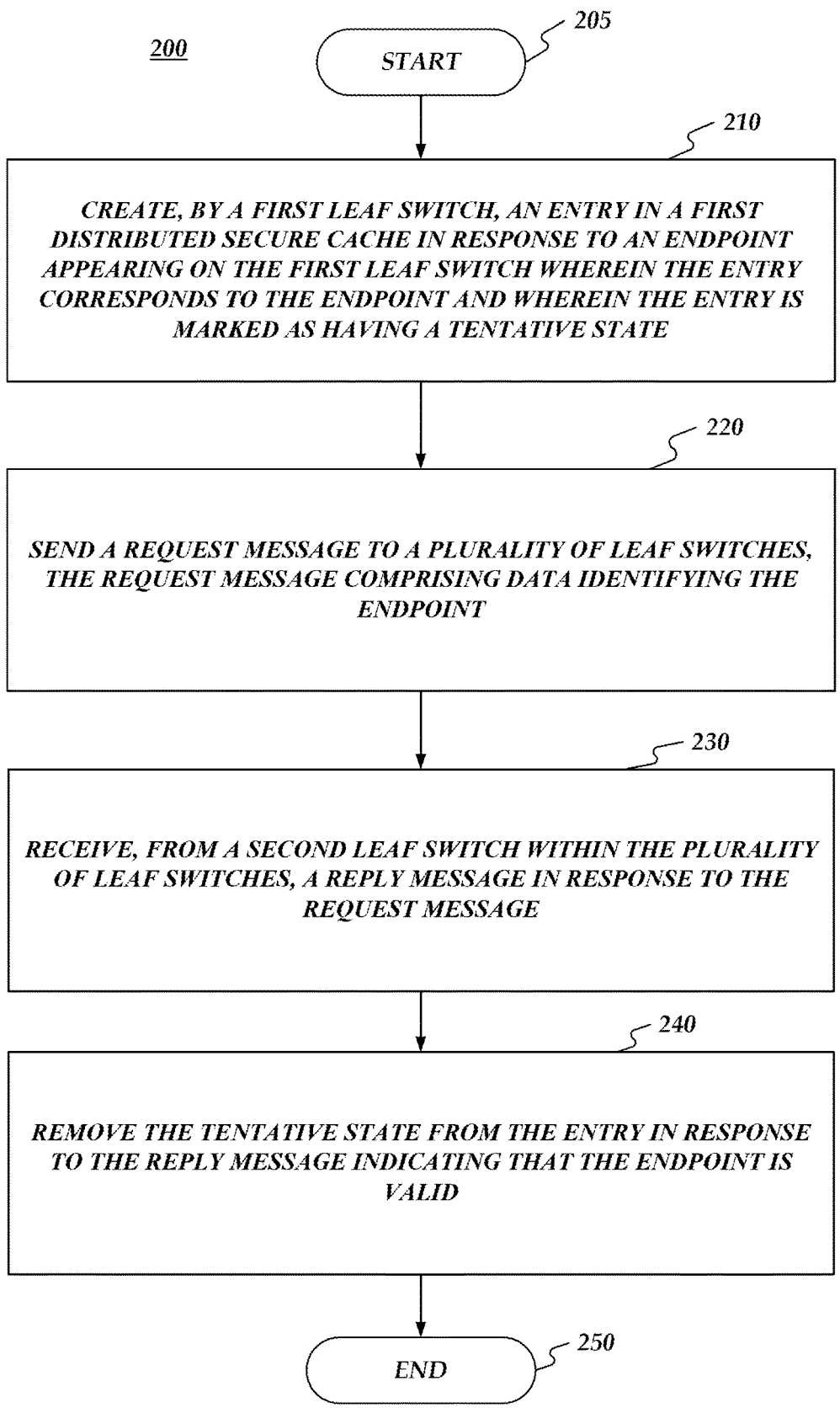
FIG. 2 is a flow chart of a method for providing theft detection in data center networks.

FIG. 2 is a flow chart setting forth the general stages involved in a method 200 consistent with an embodiment of the disclosure for providing theft detection in data center networks. Method 200 may be implemented using one of plurality of leaf switches 116 as described in more detail above with respect to FIG. 1. For example, method 200 may be implemented using first leaf switch 128, however, any of plurality of leaf switches 116 may be used and embodiments of the disclosure are not limited to first leaf switch 116. Ways to implement the stages of method 200 will be described in greater detail below.

An endpoint in a network may be identified by its endpoint group and assigned Internet Protocol (IP) address and media access control (MAC) address. Plurality of leaf switches 116 in the data center fabric (e.g., of first data center 102 and second data center 104) may provide network connectivity to endpoints and may dynamically build a distributed secure cache of locally connected endpoints to their front panel ports. Each of plurality of leaf switches 116 may have its own distributed secure cache that may be local to and stored on the corresponding leaf switch in plurality of leaf switches 116. Each of plurality of leaf switches 116 may build its own distributed secure cache by snooping control protocol packets originated from its own endpoints and learning necessary information during the address provisioning and the address resolution phases of these endpoints. The control protocols may include, but are not limited to, Address Resolution Protocol (ARP), Internet Control Message Protocol (ICMP) version 6 (v6), Neighbor Discovery (ND) Protocol, Dynamic Host Configuration Protocol (DHCP) version 4 (v4), Dynamic Host Configuration Protocol (DHCP) version 6 (v6), Internet Control Message Protocol (ICMP) version 6 (v6), Router Protocol, and Prefix Discovery.

Each endpoint in the distributed secure cache may be associated with a preference level. The preference level may be determined by matching endpoint attributes of the endpoint to a trust policy and/or the learning method used. Examples of preference levels include, but are not limited to, Untrusted (e.g., learned from ARP or ND), learned from DHCP, learned statically from config, learned on Trusted endpoint group, etc.

Consistent with embodiments of the disclosure, any endpoint newly learned by any of plurality of leaf switches 116 may be secured in the leaf switches corresponding distributed cache only after performing certain validation checks for its authenticity in the entire fabric. In performing these validation checks, the fabric leaves (e.g., in plurality of leaf switches 116) may first perform security checks to detect identity theft attempts by newly seen endpoints before securing them in their corresponding distributed caches by querying all remote leaves in plurality of leaf switches 116. The endpoints failing to pass the validation checks may be blocked and denied access to the network.

Embodiments of the disclosure, for example, may use of ICMPv6 Neighbor Discovery Duplicate Address Request (DAR) and Duplicate Address Confirmation (DAC) messages in the data plane to query remote leaves to detect any presence of an already secured endpoint with same identity in the fabric. The DAR message may carry the identity of the endpoint being verified and its preference level associated at the leaf switch initiating the query. The process for performing endpoint validation before allowing moves and securing it in the distributed secure cache by a leaf switch is described in greater detail below with respect to method 200. Consistent with embodiments of the disclosure, while the theft detection process is underway, no control and data packets from the endpoint being interrogated may be allowed to flow through the fabric.

Method 200 may begin at starting block 205 and proceed to stage 210 where first leaf switch 128 may create an entry in a first distributed secure cache in response to an endpoint appearing on first leaf switch 128. The entry may correspond to the endpoint and may be marked as having a tentative state. For example, when a new endpoint appears on first server 136 connected to first leaf switch 128, first leaf switch 128 may newly see the new endpoint and, in response, create an entry in the first distributed secure cache in a tentative state. First distributed secure cache may correspond to first leaf switch 128 and may reside on first leaf switch 128.

From stage 210, where first leaf switch 128 creates the entry in the first distributed secure cache in response to the endpoint appearing on first leaf switch 128, method 200 may advance to stage 220 where first leaf switch 128 may send a request message to the other leaf switches in plurality of leaf switches 116. The request message may comprise data identifying the endpoint. For example, in order to validate or verify the newly seen endpoint, first leaf switch 128 may broadcast, for example, a DAR message to all leaf switches within the fabric where the Bridge Domain is deployed (e.g., plurality of leaf switches 116) to find if the newly seen endpoint is already learned and secured on any remote leaf switch.

Once first leaf switch 128 sends the request message to plurality of leaf switches 116 in stage 220, method 200 may continue to stage 230 where first leaf switch 128 may receive, from second leaf switch 130 within plurality of leaf switches 116, a reply message in response to the request message. For example, leaf switches in the fabric receiving the DAR message may check if the endpoint being verified is already present in their own corresponding local distributed secure caches. If the endpoint being verified (e.g., as identified in the DAR message) is not present in its corresponding local distributed secure caches, the receiving leaf switch may silently ignore the DAR message that it received. However, if the endpoint being verified (e.g., as identified in the DAR message) is already secured in a receiving leaf switch's local cache, the receiving leaf switch may poll the endpoint's old location as indicated by the receiving leaf switch's local cache for its existence (reachability).

The receiving leaf switch may poll by sending an ARP probe (e.g., for Internet Protocol version 4 (IPv4)) or an ND probe (e.g., for Internet Protocol version 6 (IPv6)). The ARP and ND probes may not be flooded in the fabric, but may be directed to a front panel port of the leaf switches and using the same dot1q vlan on which the endpoint was originally learned. Using an ARP probe message or using an ND probe message to verify the reachability of an already secured endpoint at its old location in a network are described in U.S. Pat. Nos. 8,107,396 and 8,893,271, respectively. U.S. Pat. Nos. 8,107,396 and 8,893,271 are incorporated herein by reference.

Second leaf switch 130 may determine that the endpoint being verified (e.g., as identified in the DAR message received from first leaf switch 128) is already secured in its local cache (e.g., the second distributed secure cache). In response to determining that the endpoint being verified is already secured in its local cache, second leaf switch 130 may poll the endpoint's old location as indicated by the second distributed secure cache for its existence (i.e., reachability).

If second leaf switch 130 receives a probe reply in response to polling the endpoint's old location, second leaf switch 130 may compare a first preference level received in the DAR message from first leaf switch 128 with a second preference level associated with the locally secured endpoint entry obtained from the data entry corresponding to the endpoint in the second distributed secure cache. If the second preference level is greater than or equal to the first preference level, the reply message in response to the request message (e.g., a reply DAC message) may be sent from second leaf switch 130 to first leaf switch 128 with status as DUPLICATE, and deny the move and indicating the attempt as theft. If the second preference level is less than the first preference level, the reply message in response to the request message (e.g., a reply DAC message) may be sent from second leaf switch 130 to first leaf switch 128 with status as REMOVED to indicate the move is granted and the endpoint entry may be deleted from the second distributed secure cache of second leaf switch 130. If second leaf switch 130 does not receive a probe reply in response to polling the endpoint's old location, the reply message in response to the request message (e.g., a reply DAC message) may be sent from second leaf switch 130 to first leaf switch 128 with status as REMOVED to indicate the move is granted. The endpoint entry may be deleted from the second distributed secure cache of second leaf switch 130.

After first leaf switch 128 receives the reply message in response to the request message in stage 230, method 200 may proceed to stage 240 where first leaf switch 128 may remove the tentative state from the entry in response to the reply message indicating that the endpoint is valid. For example, first leaf switch 128 may mark the tentative endpoint entry as secure if no DAC response is received, or if DAC response is received with a status as REMOVED, else the tentative entry of the new endpoint shall be deleted from the local cache. In other words, a tentative entry (i.e., state) may be declared valid, for example, in case: 1) no response was received within a predetermined time period; or 2) A REMOVED response was received. Embodiments of the disclosure may also include a process where negative responses may be sent (i.e., "I don't have it") instead of being silent, as described above. In this example, the entry may then be declared as valid when a number of expected negative responses are received. This approach may provide an improved response time. Once first leaf switch 128 removes the tentative state from the entry in response to the reply message indicating that the endpoint is valid in stage 240, method 200 may then end at stage 250.

Figure 3:
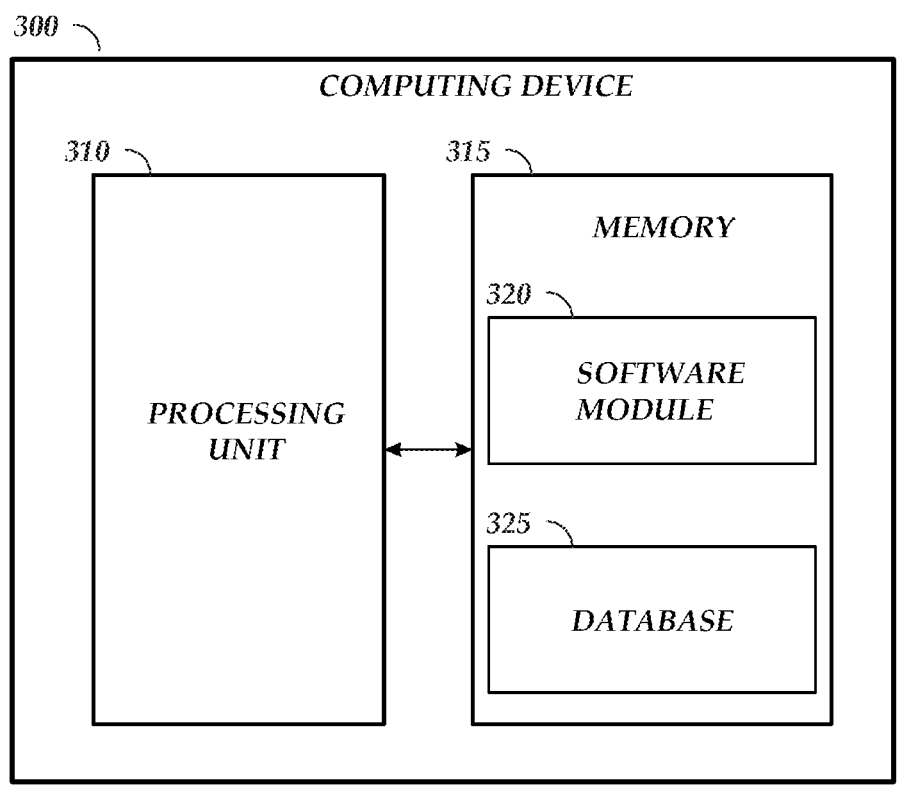
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform processes for providing theft detection in data center networks, including for example, any one or more of the stages from method 200 described above with respect to FIG. 2. Computing device 300 may provide an operating environment for any one of more of plurality of controllers 112, plurality of spine switches 114, plurality of leaf switches 116, and plurality of servers 118.

Computing device 300 may be implemented using a Wi-Fi access point, a cellular base station, a tablet device, a mobile device, a smart phone, a telephone, a remote control device, a set-top box, a digital video recorder, a cable modem, a personal computer, a network computer, a mainframe, a router, a switch, a camera, a load balancer or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example, but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including, but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 1 may be integrated onto a single integrated circuit. Such an SOC device may include one or more processing units, graphics units, communications units, system virtualization units and various application functionality of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
creating, by a first leaf switch, an entry in a first distributed secure cache in response to an endpoint appearing on the first leaf switch wherein the entry corresponds to the endpoint and wherein the entry is marked as having a tentative state;
sending a request message to a plurality of leaf switches, the request message comprising data identifying the endpoint;
receiving, from a second leaf switch within the plurality of leaf switches, a reply message in response to the request message;
removing the tentative state from the entry in response to the reply message indicating that the endpoint is valid;
receiving, by the second leaf switch, the request message;
determining, by the second leaf switch, that a data entry corresponding to the endpoint is present in a second distributed secure cache;
polling, by the second leaf switch in response to determining that the data entry corresponding to the endpoint is present in the second distributed secure cache, a location corresponding to the endpoint as indicated by the data entry corresponding to the endpoint in the second distributed secure cache;
receiving, by the second leaf switch in response to polling the location corresponding to the endpoint as indicated by the data entry corresponding to the endpoint in the second distributed secure cache, a poll reply; and
sending, by the second leaf switch in response to receiving the poll reply, the reply message indicating that the endpoint is valid when a first preference level is greater than a second preference level, first preference level being received in the request message, the second preference level being obtained from the data entry corresponding to the endpoint in the second distributed secure cache.

2. The method of claim 1, wherein creating the entry in the first distributed secure cache comprises creating the entry in the first distributed secure cache wherein the first distributed secure cache corresponds to the first leaf switch.

3. The method of claim 1, wherein sending the request message to the plurality of leaf switches comprises sending the request message to the plurality of leaf switches wherein the request message comprises a Discovery Duplicate Address Request (DAR) message.

4. The method of claim 1, wherein sending the request message to the plurality of leaf switches comprises sending the request message to the plurality of leaf switches wherein the plurality of leaf switches comprise leaf switches within a fabric where a Bridge Domain is deployed.

5. The method of claim 1, further comprising removing the data entry corresponding to the endpoint from the second distributed secure cache when the first preference level is greater than the second preference level.

6. The method of claim 1, wherein determining that the data entry corresponding to the endpoint is present in the second distributed secure cache comprises determining that the data entry corresponding to the endpoint is present in the second distributed secure cache wherein the second distributed secure cache corresponds to the second leaf switch.

7. A method comprising:
creating, by a first leaf switch, an entry in a first distributed secure cache in response to an endpoint appearing on the first leaf switch wherein the entry corresponds to the endpoint and wherein the entry is marked as having a tentative state;
sending a request message to a plurality of leaf switches, the request message comprising data identifying the endpoint;
receiving, from a second leaf switch within the plurality of leaf switches, a reply message in response to the request message;
removing the entry in the first distributed secure cache in response to the reply message indicating that the endpoint is not valid;
receiving, by the second leaf switch, the request message;
determining, by the second leaf switch, that a data entry corresponding to the endpoint is present in a second distributed secure cache;
polling, by the second leaf switch in response to determining that the data entry corresponding to the endpoint is present in the second distributed secure cache, a location corresponding to the endpoint as indicated by the data entry corresponding to the endpoint in the second distributed secure cache;
receiving, by the second leaf switch in response to polling the location corresponding to the endpoint as indicated by the data entry corresponding to the endpoint in the second distributed secure cache, a poll reply; and
sending, by the second leaf switch in response to receiving the poll reply, the reply message indicating that the endpoint is not valid when a first preference level is one of the following: less than a second preference level and equal to the second preference level, first preference level being received in the request message, the second preference level being obtained from the data entry corresponding to the endpoint in the second distributed secure cache.

8. The method of claim 7, wherein creating the entry in the first distributed secure cache comprises creating the entry in the first distributed secure cache wherein the first distributed secure cache corresponds to the first leaf switch.

9. The method of claim 7, wherein sending the request message to the plurality of leaf switches comprises sending the request message to the plurality of leaf switches wherein the request message comprises a Discovery Duplicate Address Request (DAR) message.

10. The method of claim 7, wherein sending the request message to the plurality of leaf switches comprises sending the request message to the plurality of leaf switches wherein the plurality of leaf switches comprise leaf switches within a fabric where a Bridge Domain is deployed.

11. The method of claim 7, wherein determining that the data entry corresponding to the endpoint is present in the second distributed secure cache comprises determining that the data entry corresponding to the endpoint is present in the second distributed secure cache wherein the second distributed secure cache corresponds to the second leaf switch.

* * * * *